United States Patent [19]
Hogan et al.

[11] Patent Number: 6,166,531
[45] Date of Patent: Dec. 26, 2000

[54] THREE PHASE TO SINGLE PHASE POWER PROTECTION SYSTEM WITH MULTIPLE PRIMARIES AND UPS CAPABILITY

[75] Inventors: Michael W. Hogan, New Lisbon; Gary Jungwirth, Nekoosa; Teresa A. Kamper, Camp Douglas; Gregory C. Kohls, Nekoosa, all of Wis.

[73] Assignee: UPPI Corporation, Adams, Wis.

[21] Appl. No.: 09/551,823

[22] Filed: Apr. 18, 2000

[51] Int. Cl.[7] ...................................................... H01F 30/12
[52] U.S. Cl. ................................................ 323/361; 336/5
[58] Field of Search ...................................... 323/355, 361, 323/362; 336/5, 12, 170

[56] References Cited

U.S. PATENT DOCUMENTS

| | | | |
|---|---|---|---|
| 4,800,356 | 1/1989 | Ellis | 336/184 |
| 4,862,059 | 8/1989 | Tominaga et al. | 323/307 |
| 5,317,299 | 5/1994 | Dhyanchand et al. | 336/5 |

*Primary Examiner*—Matthew Nguyen
*Attorney, Agent, or Firm*—Murray Leonard

[57] ABSTRACT

This invention relates to methods of providing uninterruptible, regulated, single phase power to a critical single phase load when such power is derived from two of the phases of a polyphase power source. This invention describes a dual primary ferroresonant transformer which provides regulated and isolated voltage to a single phase critical load, when powered by a plurality of phases from a polyphase power source, and whereby a loss of electrical power to either a first or a second primary does not disturb the single phase power output voltage.

6 Claims, 11 Drawing Sheets

VOLTAGE AND FLUX PHASES IN THE FERRORESONANT TRANSFORMER CORE.

EQUIVALENT CIRCUIT OF THE DUAL PRIMARY FERRORESONANT TRANSFORMER

RS = SOURCE RESISTANCE
VL = LINE VOLTAGE
LL = WIRING INDUCTANCE
LE = LEAKAGE INDUCTANCE
LM = MAGNETIZING INDUCTANCE
RE = EQUIVALENT SEIES RESISTANCE
CD = DISTRIBUTED CAPACITANCE
CT = TANK CAPACITANCE
LT = TANK INDUCTANCE
RL = LINE RESISTANCE
V. OUT = OUTPUT VOLTAGE

THREE PHASE TO SINGLE PHASE POWER PROTECTION SYSTEM WITH MULTIPLE PRIMARIES AND UPS CAPABILITY

TECHNICAL FIELD

This invention relates to methods of providing uninterruptible, regulated, single phase power to a critical single phase load when such power is derived from two or more of the phases of a polyphase or three phase WYE power source and the neutral connection of the same polyphase or three phase power source. Alternatively, the power may be obtained from two phases of a delta winding of the polyphase or three phase power source. This invention describes a polyphase ferroresonant transformer having a plurality of primary windings, which provides regulated and isolated single phase voltage to a single phase critical load, when connected to two phases of a polyphase electric power system. For ease of illustration, the transformer of this invention is illustrated as being connected between two phases of a three phase system and the neutral connection, or two phases of a delta three phase system. A three phase electrical system is a special case of a polyphase power system. Independent failure of either of the two connected phases or the third phase of the three phase system results in continuous, unbroken, and regulated single phase power to the critical single phase load which is connected to the output of the referenced transformer of the instant invention.

The use and advantages of three phase electrical power are not part of the instant invention, as those characteristics are well known to those versed in the art of electrical power distribution and electronics.

DESCRIPTION OF THE PRIOR ART

A transformer is a device which uses electrically created magnetic fields within a magnetic core to change voltages from one value to another. For example, the transformer can be used to change voltages from 240 volts to 120 volts, 120 volts to 240 volts, 120 volts to 6 volts, or to virtually any combination of voltages. When the input and output voltages are the same. For example, the voltages can be 240 volts to 240 volts, or 120 volts to 120 volts, the transformer is usually called an isolation transformer. This may seem confusing because most multiple winding transformers that change voltage levels also provide isolation. The auto-transformer, which provides variable output voltages, however, does not provide isolation between primary and secondary windings.

Voltage changing transformers are usually described as "conventional" or "linear" transformers. The incoming voltage is often called the power line voltage, or the primary voltage, and the output voltage is often called the secondary voltage or output voltage. Those references are used extensively in this application.

In many respects, the ferroresonant transformer does the same job as a "conventional" or "linear transformer" just described. The ferroresonant transformer may be used to change power line voltage from one voltage to another or it may be used only as an isolation transformer, where no change in voltage is desired. (E.G. 120 volts in, 120 volts out). The linear transformer changes voltages, but it also passes along the changes in input voltages as they occur, and most of the noise on the power line as well, to the secondary or output. For example, a transformer may be used to change 660 volts used for local street power distribution to 120 volts for home use, but if the 660 volts changes up or down by 20%, the 120 voltage sent to the home will also change up or down by the same 20%. The house voltage may vary from 96 volts to 144 volts. Such large voltage swings may be deleterious to equipment which is connected to the power lines. For example, increasing the voltage to a common light bulb by ten percent can reduce the expected life by one half The ferroresonant transformer was developed to eliminate this problem of fluctuating voltage. By regulating the 20% change to a 2% change (for example), the output voltage of the ferroresonant transformer could be held between 117.6 to 122 volts instead of 96 to 144 volts, a change of 4.4 volts instead of 48 volts!

This is not a new idea. The ferroresonant transformer (usually called a "Ferro" in industry) was invented about fifty years ago, by Sola, in order to provide constant voltages where AC power was fluctuating. The invention was very successful, and the ferroresonant transformer provided excellent line and load voltage regulation for both low line and high line conditions. In the early days, most applications were in the lighting industry, where the undesirable voltage fluctuations affected light output and greatly reduced the life of the expensive light bulbs.

As years passed, the ferroresonant transformer was used to provide constant voltage in more critical applications, such as television receivers, power supplies, and other scientific equipment.

Ferroresonant transformer prior art is very plentiful. The product has been in use for more than fifty years, and the fundamental device has found its way into many electrical products. A typical single-phase ferroresonant transformer construction is shown symbolically in FIG. 4, which illustrates a single power line primary winding. A search of prior art did not reveal any ferroresonant or conventional transformer design of the present invention. No prior art shows the second AC primary with the reversed phase, so that connection to two phases of a polyphase system are possible wherein the loss of power on one of the phases results in no loss of single phase output from the ferroresonant transformer as claimed in the instant invention. It is unlikely that both phases of the three phase system is likely to fail at the same time. In this respect, the present invention is a form of uninterruptible power source.

PRIOR ART

Typical Prior Art Patents which Show Design and Applications Include, but are not Limited to:

U.S. Pat. No. 4,088,942 Ferroresonant Transformer Structure, Issued May 9, 1978 to Sandor Miko. This patent shows a ferroresonant transformer structure employing a core with a magnetically saturated section and a non saturated section. A single primary excitation is illustrated.

U.S. Pat. No. 4,460,954 Ferroresonant Power Supply, Issued Jul. 17, 1984 to Leroy W. Aiken. A higher efficiency ferroresonant transformer is shown having a single primary. Although two primary sections are shows, they are in phase, in electrical series, allowing the transformer primary to be operated from more than one input voltage.

U.S. Pat. No. 3,843,918 Ferroresonant Transformer Battery Charger, Issued Oct. 22, 1974 to Earl C. Rhyne. This patent illustrates a ferroresonant transformer having a single primary winding and a tapped secondary for powering a plurality of rectifier diodes.

U.S. Pat. No. 4,274,071 Three-phase Ferroresonant Transformer Structure Embodied in One Unitary Transformer Construction. Issued Jun. 16, 1981 to Edgar L.

Pfarre. This patent reveals a collection of "C" tape wound cores assembled in a manner which allows the transformer to be operated by three phases of a three phase system, on one magnetic structure as opposed to three separated magnetic structures.

U.S. Pat. No. 4,068,157 Regulated Multiple Transformer System, Issued Jan. 10, 1978 to John A. Bassett. This invention describes an electronically controlled three phase system for use with ferroresonant transformers. Three separate, single primary ferroresonant transformers are employed each being connected thereto to a full wave rectifier system for charging batteries, U.S. Pat. No. 3,812,415 Ferroresonant Battery Charger Circuit, Issued May 21, 1974 to Burrows Corson Van Gilder et al. A single phase, single primary ferroresonant transformer battery charger is described.

U.S. Pat. No. 5,886,507 Controlled Ferroresonant Transformer, issued Mar. 23, 1999 to Raymond G. Janik. A controlled, single primary, ferroresonant transformer is described. Magnetic air gaps are employed to adjust the controlling characteristics of the transformer.

U.S. Pat. No. 5,912,553 Alternating current ferroresonant transformer with low harmonic distortion. Issued Jun. 15, 1999 to James F. Mengelkoch. This patent describes the addition of additional windings, to control the harmonic distortion of the ferroresonant transformer output.

U.S. Pat. No. 5,510,692 Ferroresonant battery charger with constant current finish rate, issued Apr. 23, 1996 to George Casper. The ferroresonant of this invention employs the equivalent of a single primary winding which is tapped in a manner well known to those skilled in the art, for providing operation at differing primary voltages U.S. Pat. No. 5,642,002 Apparatus and methods for generating uninterruptible AC power signals. Issued Jun. 24, 1997 to Fereydoun Mekanik. This patent application illustrates the use of a ferroresonant transformer in conjunction with a powered generator for Uninterruptible Power Supply operation. As in other applications, wherever multiple primary windings are used on a transformer, be it conventional or ferroresonant, the primary windings are wired in phase to enable operation at multiple voltages. An example would include two 120 volt windings. These may be connected in series for 240 volt operation or in parallel for 120 volt operation. Sometimes, a winding may be tapped for operation at some other voltage, for example, 117 volts or 95 volts.

Pat. No. 4,975,649 Method and Apparatus for Sensing Loss of Regulation in a Ferroresonant Transformer. Issued Dec. 4, 1990 to Howard H. Bobr. This patent discloses a method for detecting when a ferroresonant transformer goes out of regulation. A single primary winding is illustrated. A separate winding on the magnetic shunt provides pickup for the out of regulation detector circuit.

U.S. Pat. No. 5,638,244 Apparatus and Methods for Generating Uninterruptible Ac Power Signals, Issued Jun. 10, 1997 to Fereydoun Mekanik et al. This patent describes a ferroresonant transformer having one primary winding. The primary receives power from the AC line or from an external AC engine driven generator.

The large number of prior art ferroresonant patents is unwieldy. For the sake of brevity, the above listed patents are indicative of the type of applications in which ferroresonant transformers have been used. Other patents described therein are included by reference. Most noteworthy of these patents and the others referenced is that in general, the ferroresonant transformers employ a single primary winding. When multiple primary windings are used for voltage extension, these multiple windings are connected in series or parallel, in phase, and are effectively one winding. The present invention utilizes two independent primary windings, connected out of phase in a manner which enables the ferroresonant transformer to be operated independently from each winding or simultaneously from two phases of a polyphase power system. This feature has not been found in any prior art, in either ferroresonant transformers or conventional or linear transformers.

After several years of use, engineers discovered that the ferroresonant transformer provided other major advantages besides that of voltage regulation; The ferroresonant transformer is a magnetic line conditioner, providing magnificent noise rejection and electromagnetic interference suppression. The ferroresonant transformer can provide a large measure of lightning protection, bi-directional noise rejection, and when properly designed, the ferroresonant transformer can convert square waves to sine waves with low distortion. The ferroresonant transformer is an excellent isolation transformer, which can provide more than 120 Db of noise and spike suppression. (120 Db represents a noise suppression of one million to one.) All of these features are inherent in the ferroresonant transformer and are provided without the need for ancillary control electronics.

The ferroresonant transformer also stores a large amount of electrical energy in the L-C "Tank Circuit". This power, expressed as volt-amperes, can be called upon when required. When power was lost, the ferroresonant transformer output does not suddenly drop to zero. The stored energy contained in the transformer tank system can power the load connected to the transformer for a period of time. With proper design, the energy in the tank circuit could power the rated load for greater than a complete cycle. This specific feature has been used in the design of Uninterruptible Power Systems, pioneered by Best Power Technology, Necedah Wis.

Three Phase Power Systems.

In this country and in other parts of the world, when large, amounts of power are required, the standard power system for power distribution is three phase power. This power distribution system is composed of "three phases", where each phase of electrical power is displaced by 120 electrical degrees from each other. Very large power distribution systems are polyphase, where more than three phases are employed. The three phase method of power distribution is more economical than single phase, and is, therefore, used where industrial processes are required, or wherever large amounts of power are needed. Some applications of three phase power include, but are not limited to, hospitals, machine shops, welding companies, electroplating facilities, injection molding plants, industrial applications, and the like.

Three phase power is almost never found in the home. Where machinery such as large air conditioners or air handlers are employed, as may be required in large condominiums, or movie houses, three phase electrical power is preferred. In such industry, single phase power, derived from the three phase power source is also used.

Most power at the useable home level is "single phase", where the voltage consists of a single "hot" wire and a "neutral" or "ground". In the United States, single phase voltages, as measured between the hot wire and the ground or neutral wire are usually 120 volts RMS, at a frequency of 60 cycles per second. Single phase power may be produced by single-phase generators, or single phase may be obtained from connection between one wire of a three phase source and the neutral connection of the three phase source.

Single phase power may also be delivered to the home or industry by a distribution transformer which provides two electrical voltage phases which are typically 180 degrees apart and a neutral connection which is centered between each opposite phase voltage. In that case, single phase voltage is obtained from each phase of the transformer and its center-tap or neutral. This system provides the 240 volt-120 volt power found in many homes in the United States. In other countries, different power line voltages may be required, and this need is readily met by the use of suitable voltage changing transformers. Where low voltages are required, as in electronic systems, conventional single phase "step-down" transformers may be used. When voltage regulation is required, these step-down transformers are often ferroresonant transformers as well.

In a typical United States three phase system, where both three phase and single phase electrical power is obtained, the wire to wire three phase voltage is typically 208 volts RMS, each of the three wires in a WYE connected power system has an operating voltage from wire to neutral of 120 volts RMS. These voltages have been selected intentionally, to provide a source of 120 volt single phase power for use in the home and industry.

In a three phase DELTA system, a false neutral can be provided as a tap on one of the three phase windings to produce the required neutral, or alternatively, each phase of the three phase Delta system may be 120 volts RMS, or indeed, any desired voltage. Thus, we can see that the three phase system can provide both three phase power and any of the phases can be used as a source of 120 volt single phase power. This is a common practice.

If, however, the phase that is used to obtain single phase power is disrupted, the source of single phase power may be lost. Such loss of single phase power to an electronic control device can be disastrous. If, however, one of the other phases are disrupted, the single phase power source may not be lost, but the voltage can drop significantly, affecting any equipment which may be powered by the single phase source.

Three phase electrical power is used throughout the world. Nearly all electrical energy is generated in three phase generators and is transmitted over three phase transmission lines. Although nearly all electric power transmission is by means of three phase systems, nearly one half of the energy is eventually used as single phase power for domestic, industrial, and small power purposes.

As an example, large injection molding machines, milling machines, elevators, and industrial machinery, and processes of all kinds are powered by three phase power. The smaller control systems which operate the large machinery actually operate from single phase power which is readily derived from connection between one of the phase electrical lines and the system neutral connection in the WYE system, or from one of the phases in the Delta Power connection. These single phase loads are supplied from the low voltage secondaries of distribution transformers whose primaries are connected to the three phase transmission system as described herein. The single phase loads are usually equally distributed among the phases so as to result in an approximately balanced three phase load.

If, however, there is a loss of power on one of the phases, and the single phase power comes from that particular phase and is thus lost, the entire machine can malfunction, resulting in misoperation of the machine, and in some cases, a large economic disaster or even loss of life.

In a motor driven machine, loss of the three phase power for several electrical cycles may not result in any discernable malfunction due to the inertia of the driven load. If, however, the system control electronics loses power because one of the three phase lines has malfunctioned, the entire machine can become erratic or non-functioning, resulting in great financial loss.

Many methods have been used to assure that loss of one of the phases of the three phase system will not result in loss of single phase power to a critical load. This includes multiple power conversions from AC to DC, conventional single phase ferroresonant transformers, and the use of uninterruptible power supplies. Uninterruptible power supplies are expensive, and have other disadvantages. The primary object of this invention is to simultaneously derive single phase power not from one phase as presently done, but from two phases of the three phase power source simultaneously, by using the specialized ferroresonant transformer of the present invention. This is possible, even though one or two phases of the three phase system may fail, without the need for an uninterruptible power supply and its expensive battery system. If, however, all three phases of the power source fail, the transformer of the present invention can be used to provide emergency backup or un-interruptible power, by the addition of inverter windings and a battery powered ferroresonant inverter, in the manner previously patented and sold by Best Power Technology. Although described herein, as an application of the present invention, the battery powered Ferroresonant Uninterruptible Power Supply (UPS) in general, is not claimed as part of the present invention.

DISCLOSURE OF THE INVENTION

This invention describes a double primary winding ferroresonant transformer design which provides regulated and isolated voltage to a single phase critical load when such transformer is connected between two phases of a three phase system, and whereby independent failure of either (but not both) of the two phases or the third phase of the three phase system results in continuous, unbroken, and regulated single-phase power to a critical single phase load which is connected to the output of the referenced transformer of the present invention.

When there is a loss of one phase of the three phase power source, the other loads on which are placed that phase constitute an effective short circuit on the un-powered winding. To overcome this problem, the aforementioned ferroresonant transformer has been designed with a very low mutual inductance between its first and second primary windings so that a shorted line condition on one of the failed three phase lines will not result in the loss of single phase power to the critical load.

Each primary winding of the double primary ferroresonant transformer of the instant invention is connected to a separate phase of the three phase source. (And the neutral in the case of a WYE connected winding) The polarity of the second winding is reversed, causing the net magnetic flux of each winding in the core to add geometrically within the core at a phase angle of approximately sixty degrees. Loss of one of the two phases produces a reduction in core magnetic flux, but what remains is still a proper level of core flux to operate the ferroresonant transformer. The tank winding and tank capacitor are still completely operative in the manner known to those versed in the design of the ferroresonant transformer. Output voltage is only minimally affected, and the ferroresonant transformer remains capable of supporting its connected single phase load. The loss of one of the phases, while still maintaining the output voltage, does produce a shift in voltage phase. The effect is largely negligible in single phase loads.

In a variation of the design of the instant invention, the magnitude of the leakage or mutual inductance within the core of the instant invention can be controlled, causing the current normally consumed by the second transformer primary to be reduced to a low value, while the transformer is being energized by power to the first primary. In application, failure of the main primary voltage automatically shifts the load to the second primary winding, thus providing continuous power to the connected single phase load.

Although this invention has been described with respect to detailed embodiments thereof, it will be appreciated and understood by those skilled in the art that various changes in and form and detail thereof, may be made without departing from the spirit and scope of the claimed invention.

Where the special features of the ferroresonant transformer are not desired, a linear transformer may be wound with two primaries as described herein to achieve single phase output from two phases of the three phase power source.

OBJECTS

It is an object of this invention to provide continuous, unbroken and regulated single phase power to a critical single phase load when any one of two phases of a WYE or DELTA three phase power source fails.

It is another object of this invention is to provide continuous, unbroken and regulated power to a critical single phase load when the load on any of the three phases is shorted. The single phase load can be comprised of alternating current loads, or with suitable rectification, can be direct current loads.

The foregoing and other features of the present invention will become more apparent from the following description and accompanying drawings. Although three phase systems are illustrated, it is understood that the instant invention will work with polyphase electrical systems. (E.G. electrical systems having more than two phases, as for example, a three or a six phase electrical system.)

In either the WYE or the Delta connection, the single phase output is generally connected to its load by means of an isolating transformer. The single phase transformer may also be used to step the single phase voltage either up or down to the desired final voltage. Final single phase voltages can range from a few volts to several hundreds of volts. Voltage is generally limited by the transformer design.

Figure 1:
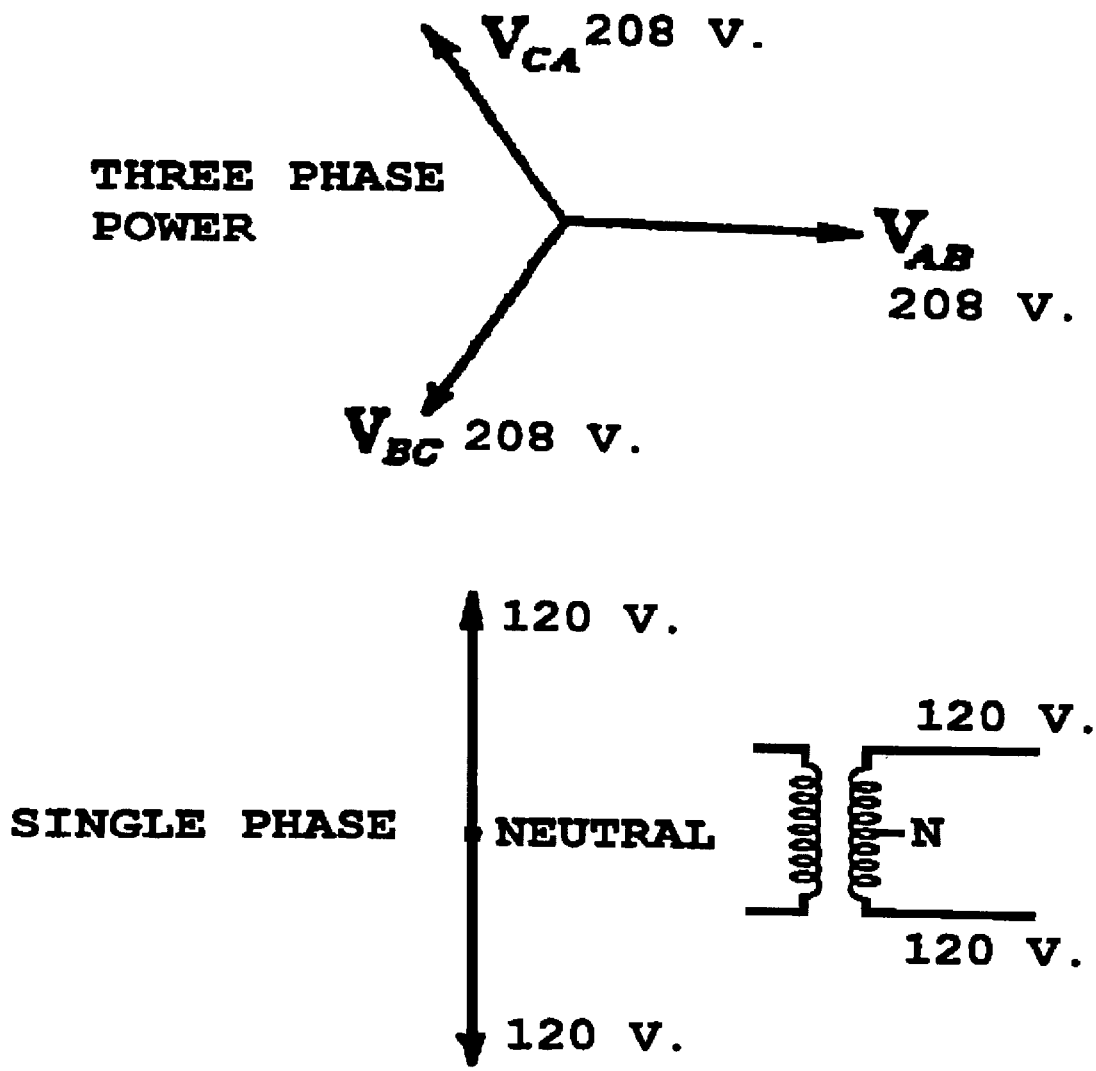
FIG. 1 illustrates the normal spatial phase vectors of a three phase electrical system. Each phase voltage is displaced 120 degrees from each other. The typical three phase system produces a phase to phase voltage of 208 volts, and a phase to neutral voltage of 120 volts RMS. A two phase vector, where each voltage is displaced 180 degrees from the other is also shown. In this case, the vector to vector voltage is usually 240 volts. The voltage vectors are displaced by 180 degrees, and add together. Each line to neutral is 120 volts. This kind of "double ended" single phase source feeds 240 volt and 120 volt power to most homes in the United States. A single phase transformer which provides these voltages is also shown.
Figure 2:
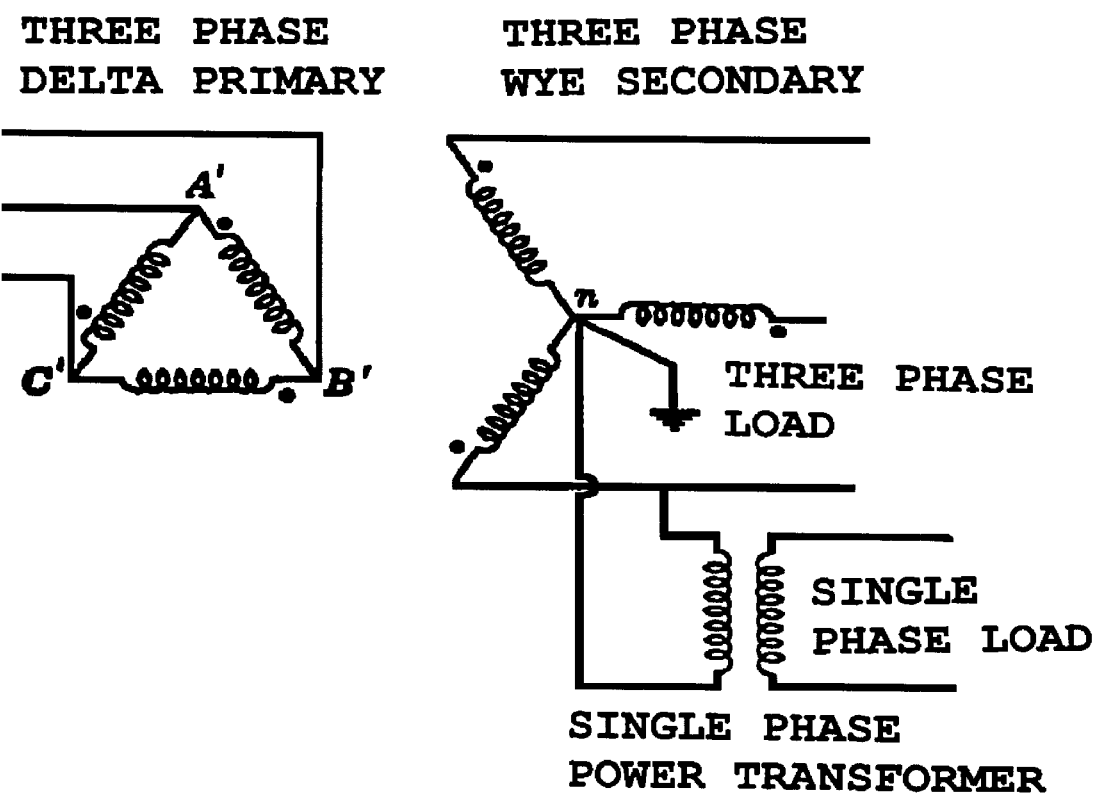
FIG. 2 illustrates how a conventional single phase voltage may be derived from ONE of the single phase voltages in a WYE connected three phase system. In a WYE connected system, the single phase voltage can be obtained from any of the three phases and the system neutral connection. In a DELTA connected system, an artificial neutral can be derived from a tap on one of the transformer windings. In general practice, the tap is not used, and the single phase voltage is derived by using a transformer across one of the Delta windings.
Figure 3:
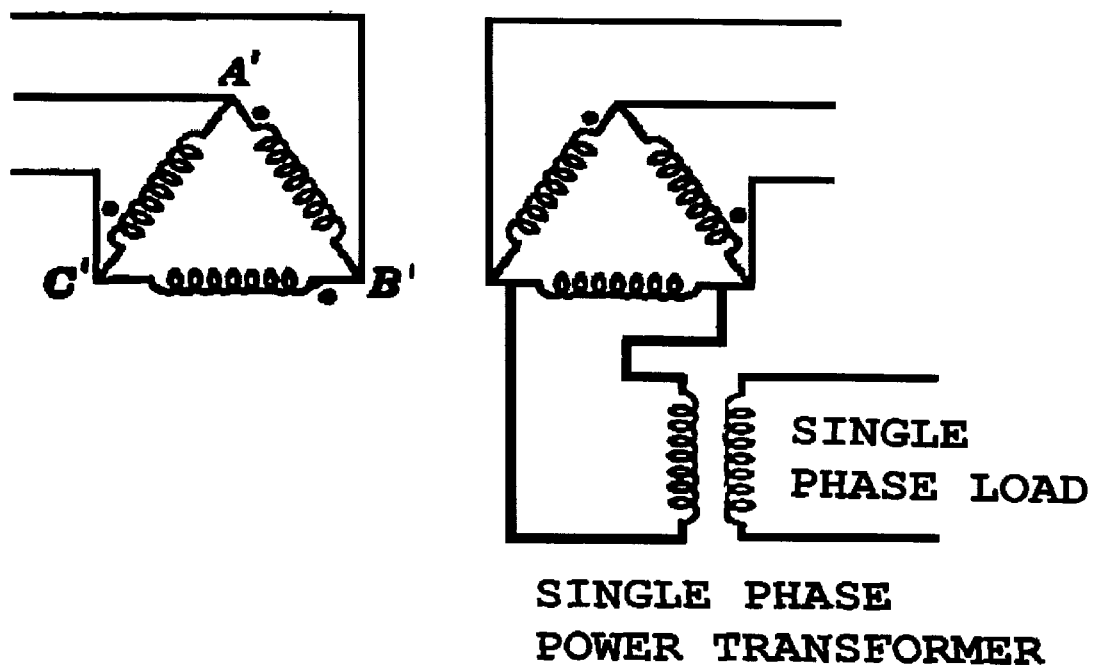

FIG. 3 illustrates a conventional transformer used in single phase applications, normally connected across one winding of a DELTA connected three phase system.

This transformer is characterized by a single power line primary winding. If inverter operation is desired, a second primary may be wound over the normal primary winding for use with an inverter, in a manner well known to power engineers.

Other windings, not shown, may be introduced into the ferroresonant transformer design in order to improve harmonic output. These compensation windings are not part of the instant design.

Figure 4:
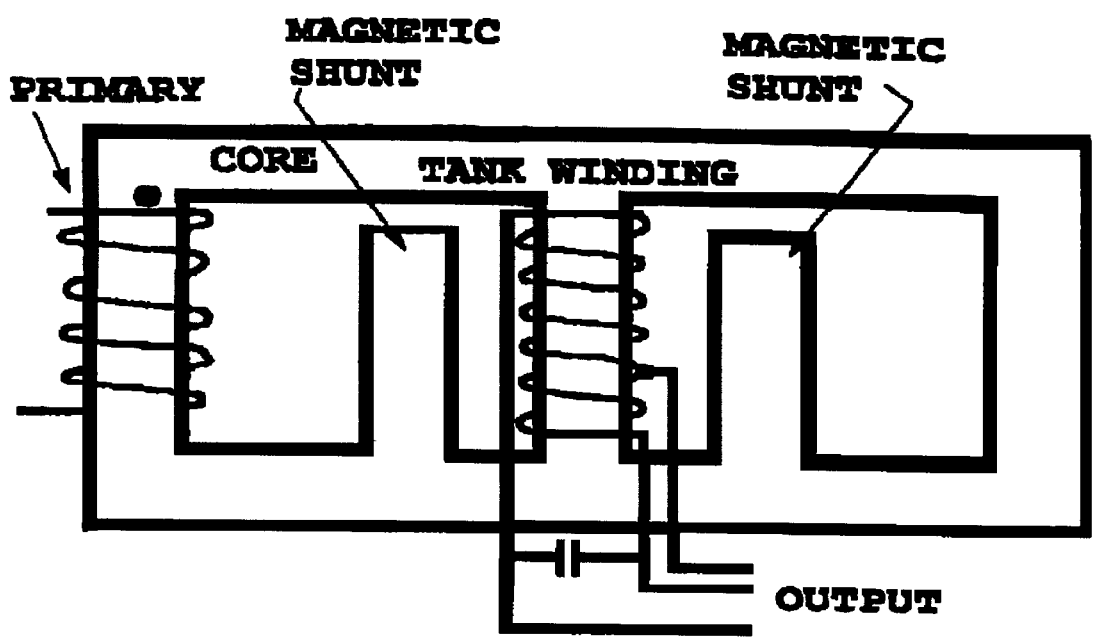

FIG. 4 illustrates a typical ferroresonant transformer used in single phase applications. This transformer is characterized by a single power line primary winding. If inverter operation is desired, a second primary may be wound over the normal primary winding for use with an inverter. In the typical ferroresonant transformer, the primaries are wound in the same window, on the same section of the core. When multiple primary windings are used, they are wound in phase.

Other windings, not shown, may be introduced to improve harmonic output. These compensation windings may be used, but are not part of the instant design. These windings are well known to those skilled in the art of transformer design, but are not shown here, for the sake of brevity as they are not part of the instant invention.

Figure 5:
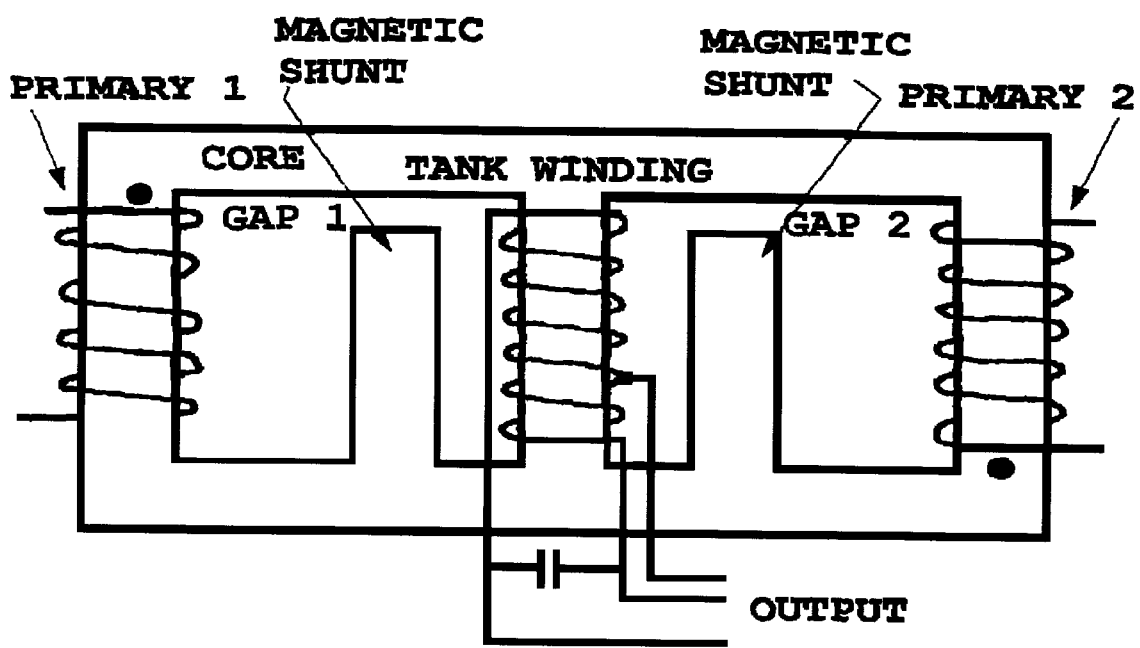

FIG. 5 illustrates the construction of the ferroresonant transformer of the instant invention. This transformer employs two primary windings which, although they provide magnetic flux energy, are physically separated on the transformer core, and are wound 180 degrees out of phase with each other. These windings are electrically and magnetically isolated from each other by the large leakage reactance provided by the use of magnetic shunts in the core. The central core of the transformer contains a "tank" winding which is tapped to provide a conductive regulated source of single phase power. Alternatively a secondary or output winding can be wound over the tank circuit, to provide a source of isolated output power. The phase of the windings is shown by "phasing dots" adjacent to each primary. The connection as described herein connects the un-dotted side of primary 1 to the dotted side of primary 2. This dot notation is well known to engineers who design transformers and those skilled in the art.

Other windings, such as those used for harmonic filtering or harmonic reduction, for compensation, and for developing special voltages may be added as required without compromising the design or intent of the instant invention. Although the spacing in the magnetic gaps are shown in the figure to be large for clarity, the gaps are actually small, typically a few mills in dimension. Each gap is adjusted by adding magnetic shims and non-magnetic spacers. These are potted in place to eliminate noise.

Figure 9:
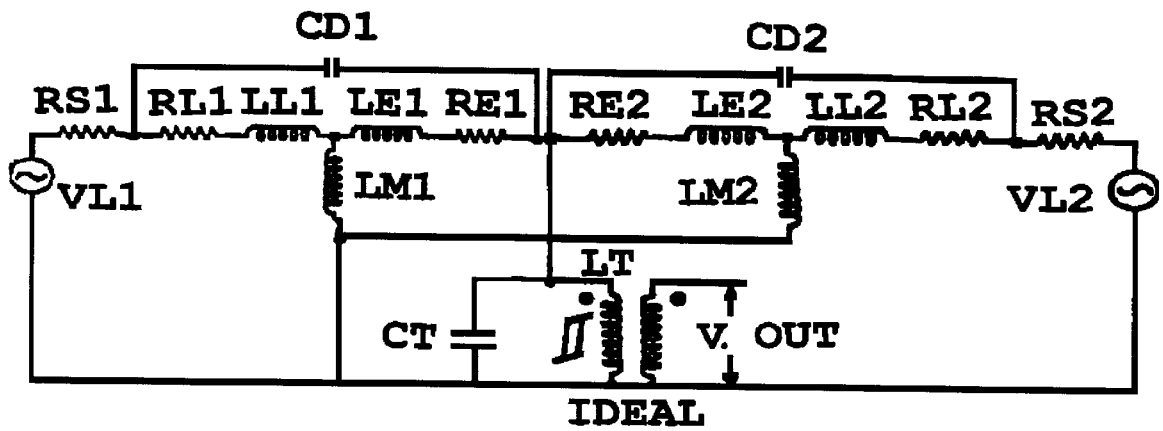

Output power can be conductive, wherein the tank circuit winding is tapped as shown in this drawing, or the output can be magnetically coupled as shown in FIG. 9.

Figure 6:
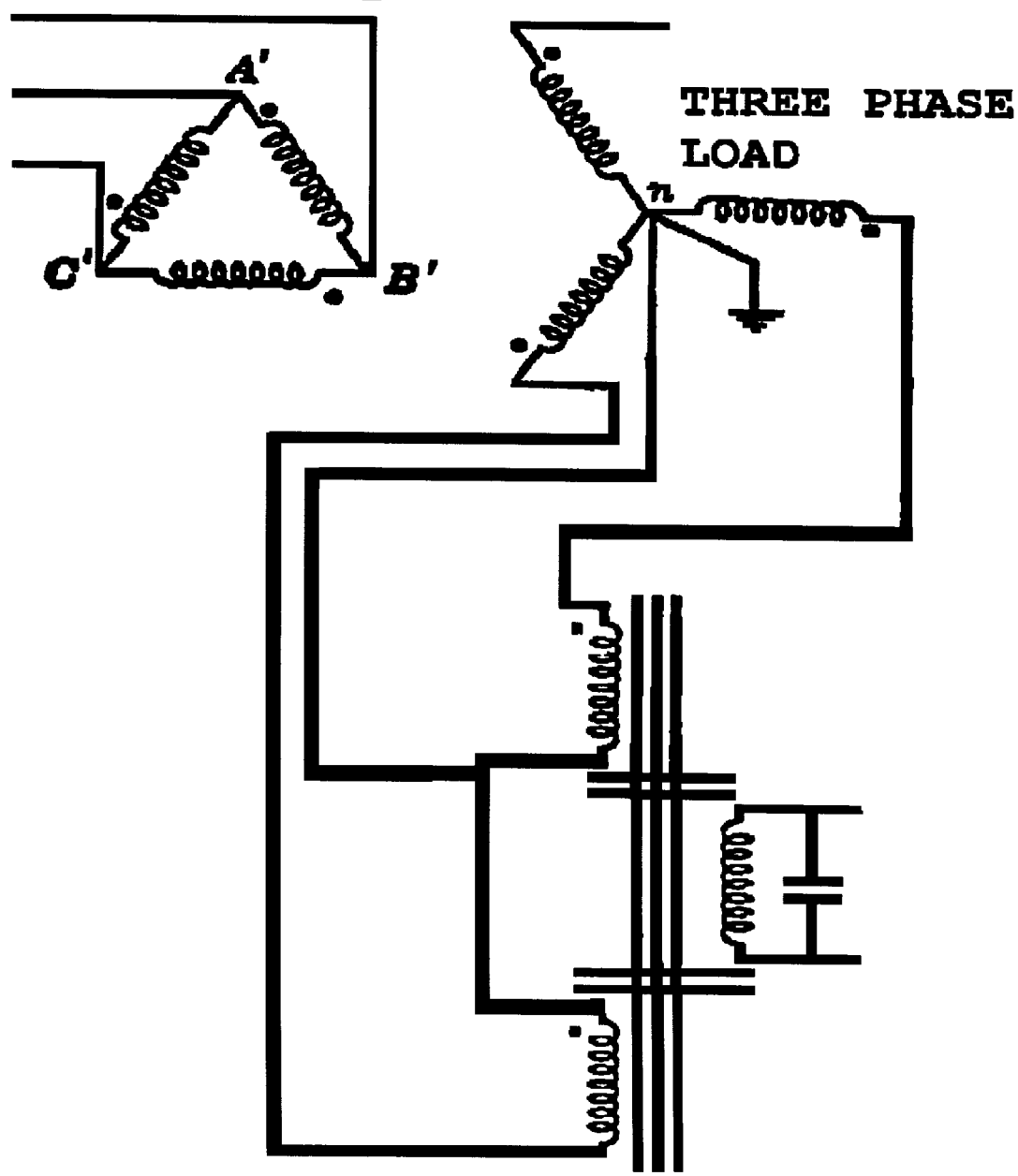

FIG. 6 illustrates the transformer of the present invention being connected to a WYE three phase power source.

Figure 7:
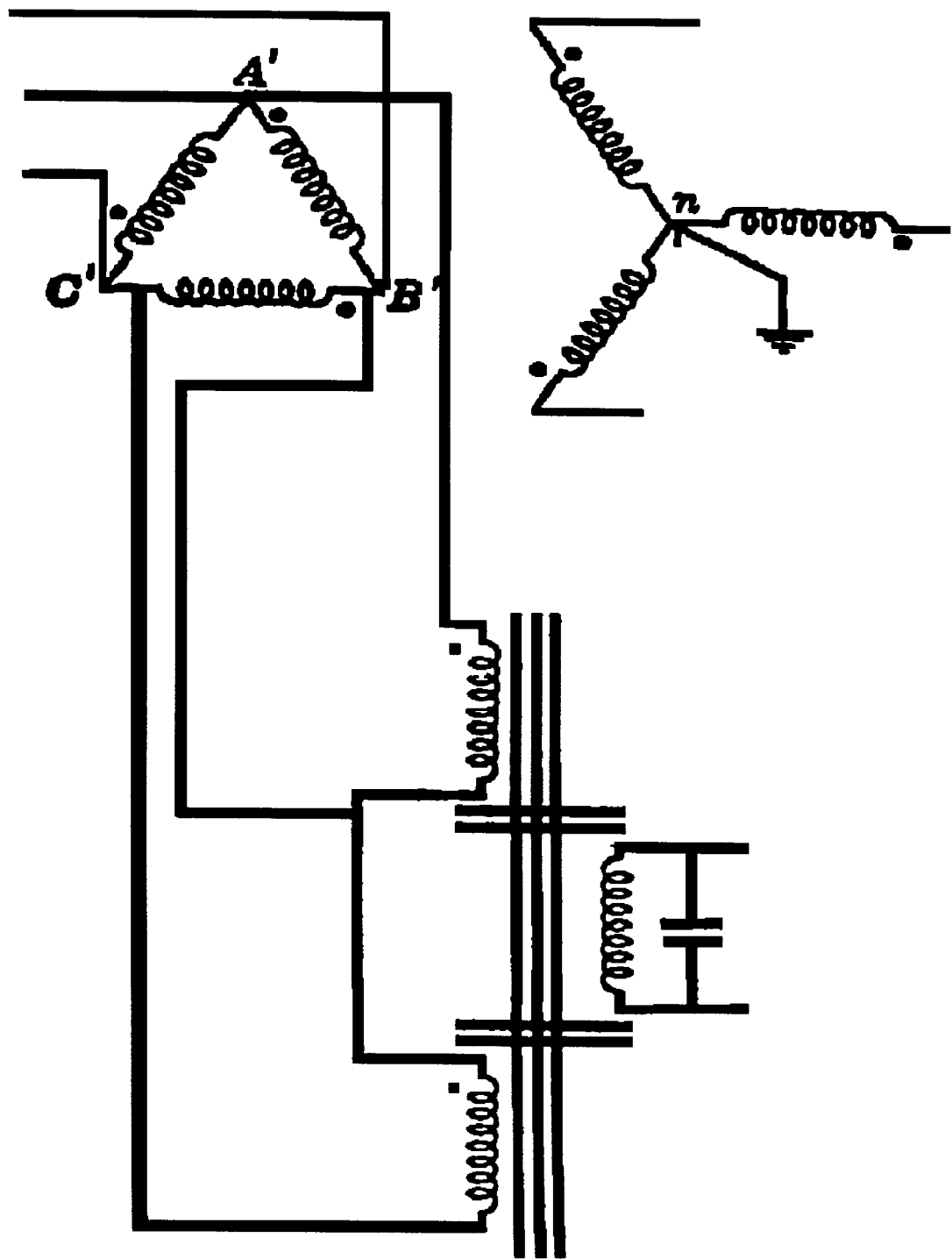
Figure 8:
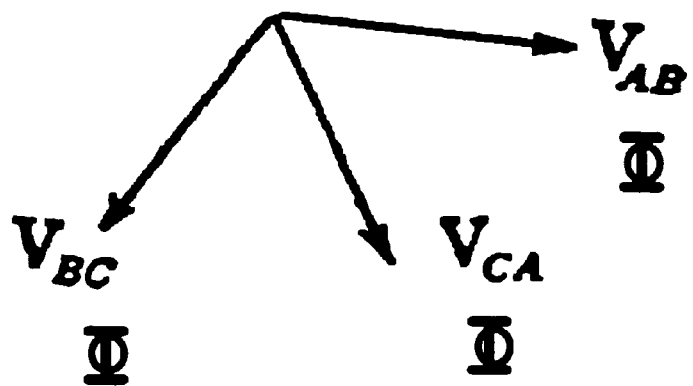

FIG. 7 illustrates the transformer of the present invention being connected to a DELTA three phase power source FIG. 8 illustrates the magnetic phase vectors in the core of the present invention. Note that one of the two phases which operate this transformer is obtained as the result of the reversal of one of the two primary winding phases which operate the transformer. This phase reversal is the heart of this invention, allowing the same transformer core to be simultaneously operated by two phases of the three phase or polyphase system.

FIG. 9 depicts a simplified equivalent circuit of the instant invention. Two voltage sources are used to power the ferroresonant transformer by means of dual separated and isolated primary windings. These are separately energized by power derived from two phases of the three phase power system. Note that the polarity of the magnetizing inductances LM1 and LM2 are reversed. Leakage inductances Le1 and Le2 are controlled by the spacing and gap size of magnetic shunts within the core. This process is well known to those versed in the art of ferroresonant transformer design. The idealized transformer output is wound on a section of the core which can be magnetically saturated by the circulating current in the tank circuit which consists of inductance LT and capacitance CT.

Figure 10:
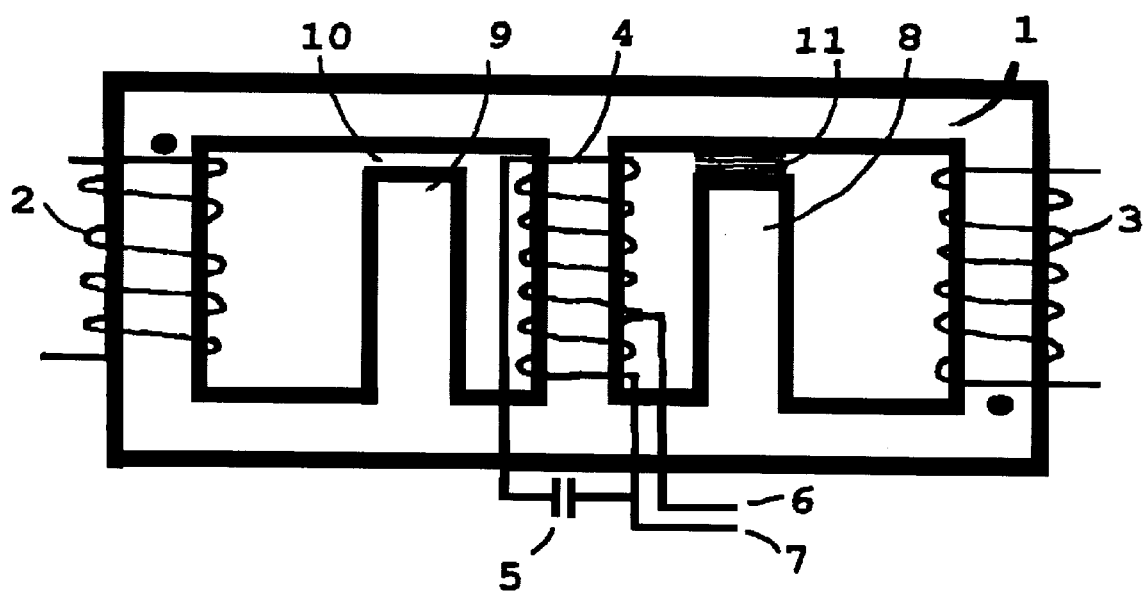

FIG. 10 is a symbolic illustration of the present invention. Component elements are numbered for ease of illustration and explanation. For clarity, the shims are shown only in one of the shunt gaps. The shims, however are installed in both core gaps.

Figure 11:
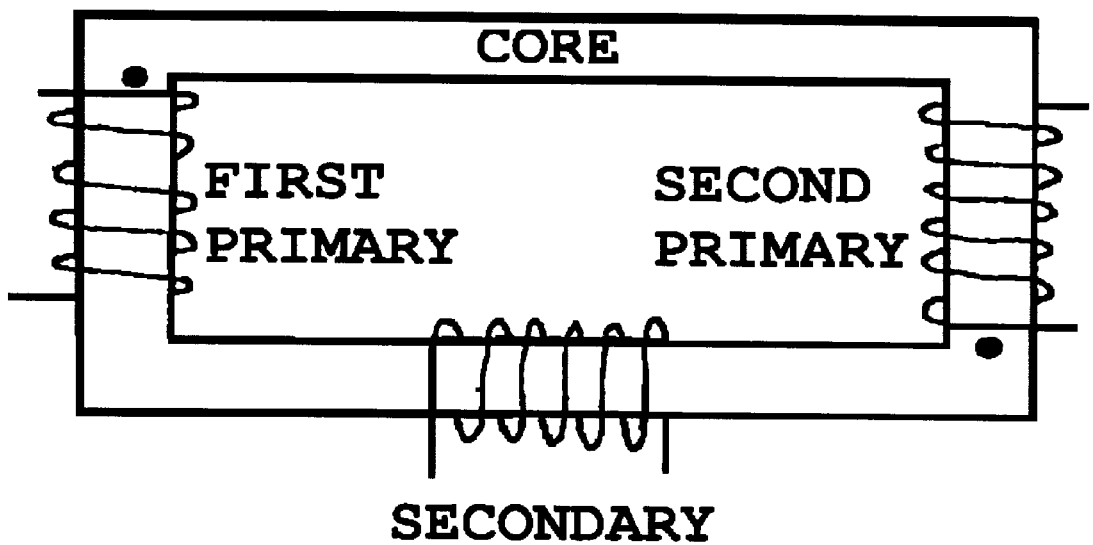

FIG. 11 depicts the instant invention as applied to a non-ferroresonant version of that invention described herein. This illustration shows other allowable variations of the invention, however, the preferred embodiment is the ferroresonant version. A circular toroid, difficult to produce, is not shown, but can be used.

BEST MODE FOR CARRYING OUT THE INVENTION

A first primary winding and a second primary winding are deposed on opposite sides of a non-saturating section of a common core of a ferroresonant transformer. Both the first primary winding and the second primary winding are identical in the number of turns, and each winding is designed to operate its section of the core at the rated voltage of the transformer without producing magnetic saturation in the core, as defined by Faraday's Equation, which is well known to all transformer designers. Typically, the design limits each primary winding operating flux level to 80 percent or less of the saturation flux density for the magnetic core material that is used. Unique to this invention is the fact that each winding is phased in 180 degrees opposition to each other. The central core of the transformer is powered by an L-C tank circuit in which enough current is developed to saturate the central section of the core. Shunts in the core structure allow the central region to be saturated while preventing the primary section of the core to remain in the linear or unsaturated region. The tank winding is designed to provide the highest voltage that is possible, consistent with safe operation of the parallel tuning capacitor. Typical voltages are in the range of 660 volts RMS, though any voltage may be used. Since the energy in the tank circuit is equal to $\frac{1}{2}C*V^2$, it is desired to have the induced voltage to this circuit be as high as is practical.

By reversing the polarity of the second primary winding, the ferroresonant or linear transformer of the present invention can be connected between two of the three phases of a three phase system and the neutral conductor. Being powered simultaneously by two phases of the three phase power source enables the ferroresonant transformer of the present invention to produce a single phase source of power simultaneously from two of the three phase sources of power. Failure of either phase will not cause the loss of the single phase output voltage. This feature exemplifies the present invention.

In the present ferroresonant invention, it is important that both the first and second primary windings be very loosely coupled to each other. High leakage reactance and low mutual inductance between the first and second primary windings is assured by placement of magnetic shunts between the windings in a manner well known to transformer designers. Such loose coupling allows the failed winding to be effectively short circuited by the connected loads without the loss of output power. Another special feature of the present invention is that while the energy from the first primary winding is pumping the tank winding with the requisite circulating volt-amperes, by manipulating the magnetic fluxes, the current in the second primary winding can be minimized. When the first primary winding fails to receive power from the line, the second primary winding then pumps the tank circuit, assuring that single phase output voltage remains constant. This is a second mode of operation of the present invention which can be controlled by selective positioning and gapping of the transformer core shunts.

The present invention is illustrated in FIG. 10. A core (1) is assembled from a stack-up of E-I laminations in the usual manner, known to transformer designers. Magnetic shunts (8) and (9) are added to control both the flux path mutual inductance and the leakage reactances of the transformer. Each shunt has an air gap (10). Shims (11) are added to each of the shunt leg air gaps (10) to control the magnetic reluctance. The drawing only shows the shims o in one air gap for the sake of clarity, but shims are included in both air gaps. In this invention, two primary windings (2) and (3) are employed, each primary winding being disposed on opposite sides of the core material as shown in the figure. It is important that each primary winding (2) and (3) be wired in opposite phase, as indicated by the phasing dots, such that normal connection between the phase voltages results in one winding being out of phase with the other. A tank inductance (4) and tank capacitance (5) are disposed upon the central magnetic leg of the transformer core, and wired in parallel. This combination forms a resonant circuit. This central leg does not have an air gap and is operated in a condition of magnetic saturation for part of the operating frequency cycle. In the configuration shown, power is removed to a single phase load by conduction in wire leads (6) and (7). It must be pointed out that a secondary winding (not shown) may be wound over the tank winding (4) to magnetically couple power to a single phase load. This secondary winding provides output power and load isolation. Variation in turns ratio allows the output voltage to be selected.

When connected to the power sources, the dotted end of the first primary winding (2) and the un-dotted end of the second primary winding (3) are connected to the "high side" sources of primary electrical power. When protection for all three phases (A, B, and C) is desired, two units of the present invention can be employed. Unit 1 is connected between phase A and B of a three phase system. Unit 2 is connected between Phases B and C, of the three phase system, thus providing N+1 protection for all three phases. This feature is especially useful when the single phase output is further converted to Direct Current, where the DC derived from each transformer can be connected in parallel for redundancy. Although the ferroresonant transformer is embodied as the best mode of this invention, it must be emphasized that those skilled in the transformer art will recognize that conventional transformers such are wound on E-I and U shaped laminations, "C" tape wound cores, Toroids and Ferrites will work as described herein, less those special functional features which belong to the ferroresonant art. The E-I lamination is preferred due to lower cost and standardized assembly considerations.

What is claimed is:

1. A ferroresonant power transformer for providing continuous single phase power when connected to a plurality of phases of a polyphase power source, said ferroresonant transformer having first and second primary windings, said primary windings being wound on separated non-saturating sections of a common magnetic core, with each of the first and second primary windings having opposite phase polarity relationships, wherein said windings are energized from two phases of a polyphase power source, providing therefore, a source of constant single phase power when either of two phases of said polyphase power source are present or when either of the two phases of said polyphase power are lost due to power failure, a tapped winding or a secondary winding providing a source of output power.

2. The ferroresonant power transformer of claim 1 wherein said first and second primary windings are separated by a large leakage reactance and low mutual inductance, said leakage reactance and controlled mutual inductance enabling the opposing primary winding to be electrically shorted without disrupting the power flow through said ferroresonant transformer.

3. The ferroresonant power transformer of claim 1 wherein said common magnetic core contains a plurality of magnetic shunts for isolation of the first primary and secondary primary windings from each other, said magnetic shunts are provided to control a specified leakage reactance and mutual inductance within said ferroresonant power transformer, and to direct the flow of magnetic flux energy within said ferroresonant transformer.

4. The ferroresonant power transformer of claim 3 wherein adjustment of said magnetic shunts by the addition or subtraction of magnetic shims enables one of said dual primaries to assume the significant role in power generation and whereby failure of electrical power to the first primary winding allows said second primary winding to assume the electrical loading required by said transformer, said power transfer occurring seamlessly with no discernable degradation in the output power of said single phase output of said ferroresonant transformer.

5. A linear power transformer for providing continuous single phase power when connected to a plurality of phases of a polyphase power source, said transformer having first and second primary windings, said primary windings being wound on separated non-saturating sections of a common magnetic core, with each of the first and second primary windings having opposite phase polarity relationships, wherein said windings are energized from two phases of a polyphase power source, providing therefore, a source of constant single phase power when either of two phases of said polyphase power source are present or when either of the two phases of said polyphase power are lost due to power failure, a tapped winding or a secondary winding providing a source of output power.

6. The linear transformer of claim 5, whereby the core of said linear transformer may be selected from the group consisting of E-I laminations, "C" tape wound cores, Toroids, or ferrite cores, wherein the E-I configuration is preferred.

* * * * *